United States Patent [19]

Rosebrooks

[11] Patent Number: 4,510,884

[45] Date of Patent: Apr. 16, 1985

[54] DEVICE FOR PROVIDING A DUAL COATING ON AN OPTICAL FIBER

[75] Inventor: Nathan B. Rosebrooks, West Thompson, Conn.

[73] Assignee: ITT Corporation, New York, N.Y.

[21] Appl. No.: 485,700

[22] Filed: Apr. 18, 1983

[51] Int. Cl.³ .................................. B05C 3/172
[52] U.S. Cl. .......................... 118/405; 118/420
[58] Field of Search .................. 118/405, 420; 427/434.7

[56] References Cited

U.S. PATENT DOCUMENTS

| 874,938 | 12/1907 | Cazin | 118/405 X |
| 2,977,632 | 4/1961 | Bunch | 118/405 X |
| 4,093,414 | 6/1978 | Swiatovy, Jr. | 425/113 |
| 4,264,649 | 4/1981 | Claypoole et al. | 427/163 |

FOREIGN PATENT DOCUMENTS

| 53-131851 | 11/1978 | Japan. |
| 53-135647 | 11/1978 | Japan. |
| 54-058344 | 11/1980 | Japan. |
| 56-096745 | 8/1981 | Japan. |
| 57-063162 | 4/1982 | Japan. |
| 57-067045 | 4/1982 | Japan. |
| 57-071836 | 5/1982 | Japan. |

Primary Examiner—John P. McIntosh
Attorney, Agent, or Firm—John T. O'Halloran; Robert P. Seitter; Mary C. Werner

[57] ABSTRACT

A device for coating optical fibers with at least two coatings. The device comprises a holding block and at least three coating dies. The holding block has an outer surface with first and second ends, and an inner surface defining a channel extending from the first end to the second end. The coating dies are press fit into the channel, separated by resin chambers. The holding block is further provided with passages providing fluid communication between the resin chambers and the outer surfaces of the holding block.

6 Claims, 3 Drawing Figures

DEVICE FOR PROVIDING A DUAL COATING ON AN OPTICAL FIBER

BACKGROUND OF THE INVENTION

The invention relates to devices for providing protective coatings on glass optical waveguide fibers.

Typically, optical waveguide fibers are produced by first manufacturing a glass preform and then drawing the preform into an optical fiber. The fiber can be drawn by placing an end of the preform into a hot furnace to soften the end thereof. The preform is then slowly fed into the furnace as an optical fiber is drawn out of the furnace from the softened end.

Optical waveguide fibers drawn from glass preforms in the manner described above are generally quite strong. For subsequent handling of the fibers, for example in producing optical fiber cables, it is necessary to maintain this high strength. However, subsequent handling can produce surface defects which significantly reduce the strength of the fiber. In order to reduce or eliminate surface defects during subsequent handling, one or more protective coatings are typically applied to the fibers immediately after they are drawn, and before they are wound on spools.

A protective coating may be provided on an optical fiber by a coating applicator device. The coating applicator may comprise, for example, a pair of wire-coating dies mounted in line in a holding block. A coating material is supplied under pressure between the two dies. As the fiber passes through the coating material, a coating is applied. Excess coating material is sheared off by the exit coating die.

While the optical fiber is provided with a protective coating after it is drawn from the hot furnace and before it is wound on a spool, the protective coating cannot be applied at any arbitrarily chosen time between these two production steps. As the fiber is drawn from the hot furnace, it must be allowed to cool for a predetermined amount of time before the coating or coatings are applied. If the fiber temperature is too high when the coating is applied, the coating material can be damaged by the excess heat.

In order to allow the hot fiber to cool before it is coated, the coating applicator must be fixed at a distance, d, from the furnace. The distance, d, is a function of the necessary cooling time, t, and the drawing velocity, v, of the fiber being drawn. This distance is given by $d = vt$. Thus, increasing the drawing velocity or the necessary cooling time increases the required distance between the furnace and the coating applicator. Since the fiber is drawn vertically down out of the furnace in a structure called a draw tower, increasing the draw velocity or the cooling time calls for increasing the height of the draw tower.

If two or more coatings are to be applied to an optical fiber, each coating is applied by a separate coating applicator, and is then cured before the next coating is applied. When two or more coating applicators are used, they are thus separated by a distance sufficient to permit curing of the previous coating before the application of the subsequent coating. The height of the draw tower, in such instances must then be increased by the additional curing distance plus the length of the second coating device. Alternatively, the draw velocity can be reduced to allow the first coating device to be placed closer to the furnace by this distance, while still allowing adequate time for the fiber to cool before the first coating is applied.

SUMMARY OF THE INVENTION

It is an object of the invention to provide a device for applying two or more coatings on an optical fiber, which device can be used without increasing the height of the draw tower or decreasing the draw velocity as compared to applying a single coating on the fiber.

It is a further object of the invention to provide a device for applying two or more separate uncured coatings on an optical fiber, which coatings are subsequently cured together after both are applied.

It is another object of the invention to provide a device for applying an uncured coating over another uncured coating without mixing the two coatings.

According to the invention, a device for coating optical fibers with at least two coatings comprises a holding block and at least three coating dies. The holding block has an outer surface with first and second ends, and an inner surface defining a channel extending from the first end to the second end. The coating dies are arranged in the channel in the holding block and are separated in the channel by first and second resin chambers. The holding block is further provided with passages providing fluid communication between each resin chamber and the outer surface of the holding block. Through these passages, coating materials can be supplied to the resin chambers.

Preferably, each coating die has a funnel-shaped passage therethrough. Each coating die is mounted in the channel in the holding block axially spaced along the channel axis and with their passages arranged coaxially. The wide openings of the funnel-shaped passages are disposed toward one end of the holding block and the narrow openings are disposed toward the other end of the holding block.

It is also preferred that the coating device according to the invention further include two pressurized coating reservoirs, and means for providing fluid communication between each reservoir and a passage in the holding block leading to a resin chamber.

In a preferred embodiment of the invention, the channel in the holding block is circularly cylindrical. In another embodiment, the pressure in the reservoir supplying the resin chamber nearer the exit of the coating device is higher than the pressure in the reservoir supplying the resin chamber nearer the input to the coating device.

The invention is advantageous because it provides two distinct coatings on an optical fiber in a device only insignificantly longer than a single-coating device. Two uncured coatings are applied, one over the other, and are subsequently cured simultaneously. As a result, an extra curing distance is avoided so the draw tower need not be raised and the draw velocity need not be reduced.

DESCRIPTION OF THE PREFERRED EMBODIMENTS

Figure 1:
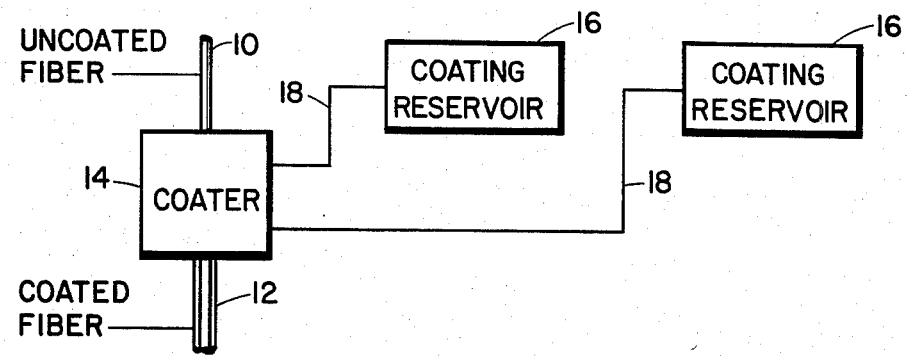
FIG. 1 is a schematic diagram of a dual coating device according to the invention.

FIG. 1 is a schematic diagram of a dual coating device according to the invention shown in the process of providing a coating on an optical fiber. In this Figure, an uncoated fiber 10 is passed through the coating device to produce a coated fiber 12 which emerges from the coating device. The coating device includes the coater 14, with or without the two coating reservoirs 16. Coating reservoirs 16 are, for example, pressurized vessels such as paint tanks containing a coating material, further described below. The coating reservoirs 16 are connected to the coater 14 by means 18 for providing fluid communication, for example high-pressure tubing.

Figure 2:
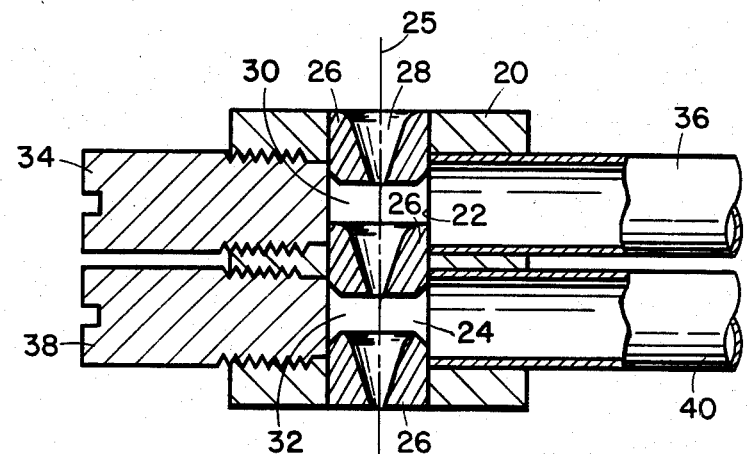
FIG. 2 is a cross-sectional view of a dual coating device according to the invention.

FIG. 2 shows the coater 14 in more detail. Coater 14 includes a holding block 20 having an outer surface with first and second ends. In FIG. 2, the first end is the top of the holding block 20 and the second end is the bottom of the holding block 20.

Holding block 20 also has an inner surface 22 which defines a channel 24 extending from the first end of the holding block to the second end. Channel 24 has an axis 25, and may be simply formed by drilling the holding block 20. Holding block 20 is preferably made from stainless steel for reasons of chemical durability. Other materials, however, such as aluminum, brass, or plastic, could be used as well.

Coater 14 also includes at least three coating dies 26. These dies 26 are, for example, press fit into channel 24 in holding block 20. To ensure a tight fit, the diameter of the channel should be slightly smaller than the diameter of each coating die 26.

Each coating die 26 has first and second ends and a funnel-shaped passage 28 connecting the ends. The funnel-shaped passage 28 has a wide opening at the first end and narrows to a small opening (a sizing orifice) at the second end. Each coating die 26 is press fit into the channel 24 with their first ends disposed toward one end of the holding block. In FIG. 2, the first, or wide-opening ends of each coating die 26 are all disposed toward the top of the holding block 20, which is the input end of the coater 14. Moreover, the coating dies 26 are arranged in the holding block 20 with their funnel-shaped passages coaxial, so an optical fiber can be drawn straight through the coating device.

Coating dies 26 are, preferably, wire-drawing dies which are available from a number of suppliers throughout the country. These dies are used because they are inexpensive, readily available in many sizes, and durable. They are typically formed from tungsten carbide, but other materials may also be used.

As shown in FIG. 2, coating dies 26 are spaced apart in channel 24. The spaces between the coating dies 26 are resin chambers 30 and 32. The second end of each of the first two coating dies 26 (the top and middle dies 26 in FIG. 2) is adjacent to a resin chamber 30 or 32. These second ends are substantially perpendicular to the channel axis 25.

Figure 3:
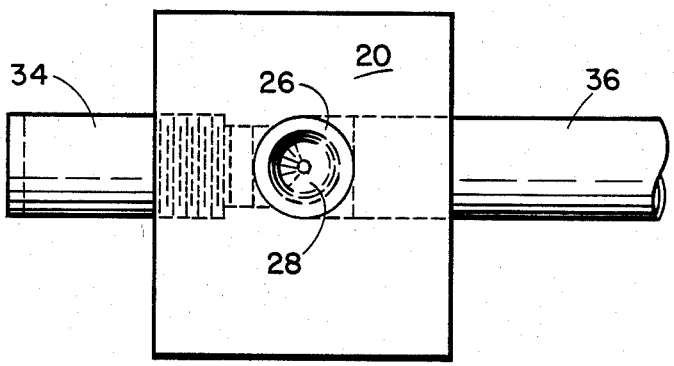
FIG. 3 is a top plan view of a dual coating device according to the invention.

Resin or some other coating material is supplied to resin chambers 30 and 32 by means of passages provided in holding block 20. These passages are formed, for example, by cross-drilling holding block 20. In FIGS. 2 and 3, a plug 34 and a tube 36 are provided in the uppermost passage which communicates with resin chamber 30. Plug 34 seals one end of the passage, while the other end of the passage provides fluid communication between resin chamber 30 and tube 36 which is mounted in the passage. Plug 38 and tube 40, mounted in the lower passage, provide the same functions as plug 34 and tube 36, respectively, for chamber 32.

The tubes 36 and 40 are connected to coating reservoirs 16 (not shown in FIGS. 2 or 3). Plugs 34 and 38, and tubes 36 and 40, are typically made of stainless steel, although other materials can also be used.

In order to use the dual-coating device according to the invention, the values of at least six parameters must be selected. These six parameters are (1) the coating material, (2) the viscosity of the coating material, (3) the application pressure of the coating material, (4) the velocity at which the optical fiber to be coated is being drawn, (5) the outer diameter of the fiber, and (6) the diameters of the sizing orifices (that is, the diameters of the narrow ends of the funnel-shaped passages in the coating dies 26). Moreover, each of these parameters (except for the fiber drawing speed) need not be the same for both the portion of the coating device providing the first coating and the portion of the coating device providing the second coating.

While there do not appear to be any inherent limits on the values of the parameters, there are certain considerations which should govern the selection of these values. First, it has been found that providing a higher pressure in resin chamber 32 (the chamber providing the second coating) than in resin chamber 30 (providing the first coating) often assures minimal mixing between the uncured materials of the two coating layers. Mixing is undesirable because each coating layer generally performs a different function and hence the materials are designed to have different properties. For example, typically the inner coating cures into a relatively soft, cushioning layer, which is often sticky and has low abrasion-resistance. The outer coating cures into a hard, protective layer, which is smooth and easy to handle.

On the other hand, if the pressure in chamber 30 greatly exceeds that in chamber 32 so that liquid coating material from chamber 32 is forced into chamber 30, it has been found that an unstable condition can arise in which the fiber may wander in the funnel-shaped passage of the primary coating die 26 (the middle die 26 in FIG. 2) and may rub against the die causing damage to the fiber. This instability can also cause undesirable mixing of the two coating materials. Moreover, if the pressure in chamber 30 is so great as to force coating material out of chamber 30 through the entrance (top) die 26, a similar instability may result with possible abrasion to the fiber.

Thus, there is always a range of acceptable pressures in the resin chambers which produce good coatings. The minimum of the range must be exceeded to assure an adequate supply of coating material, and the maximum must not be reached to avoid back flowing of the coating material.

Coating materials which can be used with the dual coating device according to the invention include, but are not limited to, ultraviolet-curable and heat-curable resins. For example, ultraviolet-curable acrylates, silicones, and epoxys may be used as coating materials. Solvent-borne coating materials, such as lacquers, may also be used. Regardless of the coating materials chosen, the viscosities of the materials should be matched close enough to minimize mixing between the uncured coatings.

The remaining parameters, namely the diameters of the sizing orifices, the fiber size, and the drawing speed are all selected based upon (1) the distance available between the furnace and the dual-coating device (in order to allow the fiber to cool before entering the coating device) and (2) the desired coating thickness. The orifice diameter and draw speed determine how large the flow of coating material must be. If these parameters are too large, the system may not be able to supply sufficient coating material, and the system will become unstable.

While the embodiment of the invention which has been described is a dual-coating device, it is contemplated that the principle of the invention could be extended to provide three or more coating layers on an optical fiber by providing a longer holding block 20, additional coating dies 26, and additional resin chambers.

EXAMPLE 1

A dual-coating device according to the invention was produced having a primary sizing orifice diameter of 240 microns and having a secondary sizing orifice diameter of 292 microns. (The primary sizing orifice is the small end of the funnel-shaped passage in the middle die 26 in FIG. 2. The secondary orifice is the small end of the passage in the bottom die 26.) A glass optical waveguide fiber having an outer diameter of 125 microns was drawn at 0.5 meters per second through the coating device. The coating materials were ultraviolet-curable urethane-acrylates applied at pressures of 3.75 pounds per square inch (measured 10 inches upstream from the entrance to the coater). The primary coating was DeSoto Desolite TM 950×030 (having a viscosity of 9000 cps±1500 cps), and the secondary coating was Desolite TM 950×042 (having a viscosity of 10,000 cps±1500 cps).

As a result of drawing the fiber through the coating device, an optical fiber having a primary coating of 190 microns and having a secondary coating of 223 microns was produced. The overall coating concentricity (herein defined as the thickness of the coating at its thinnest portion divided by the thickness of the coating at its thickest portion) was 0.77.

EXAMPLE 2

Using the same coating device and coating materials a 125 micron fiber was drawn through the coating device at 2 meters per second. The resulting coated fiber had a primary coating of 187 microns and a secondary coating of 209 microns. The overall concentricity was 0.88.

EXAMPLES 3 and 4

In Examples 3 and 4, a dual coating device according to the invention was produced having a primary sizing orifice diameter of 250 microns and having a secondary sizing orifice diameter of 350 microns. The primary coating was Desolite TM 950×030, and the secondary coating was a urethane-acrylate having a viscosity of 9000 cps±1500 cps. The coatings were applied at pressures of 3.75 pounds per square inch (measured as in Example 1).

In Example 3, fibers having outer diameters of from 54 microns to 248 microns were pulled through the dual coating device at 1.5 meters per second. Fibers having diameters from 83 to 181 microns were coated with no problems. Overall concentricities of 0.94 and greater were achieved. Smaller diameter fibers, however, were difficult to stabilize for any length of time. Larger diameter fibers experienced breaking and little, if any, primary coating (although they had good secondary coatings).

In Example 4, fibers having outer diameters of approximately 130 microns were drawn through the dual coating device at velocities from 0.2 to 2.0 meters per second. Good results, including overall coating concentricities above 0.83, were obtained. It was observed, however, that at slow draw velocities the coating material began to cure within the coating device, which should be avoided.

In the Examples, the degree of mixing of the primary and secondary coatings was observed by injecting a colored dye into the primary coating material in the coating reservoir. A transparent plexiglass dual coating device was constructed to observe the flow of the liquid coating materials. No mixing between the primary and secondary coatings was observed. After curing the coatings, the coated fiber was observed under a microscope. A sharp boundary was observed between the primary and secondary coatings, indicating that no substantial mixing occurred.

I claim:

1. A device for coating optical fibers with at least two coatings, said device comprising:
   a holding block having an outer surface with first and second ends, and having an inner surface defining a channel extending from the first end to the second end, said channel having an axis extending from the first end to the second end; and
   at least first, second, and third coating dies arranged in the channel in the holding block, said first and second coating dies being axially separated in the channel by a first resin chamber, said second and third coating dies being axially separated in the channel by a second resin chamber;
   characterized in that:
   the holding block is further provided with a first passage providing fluid communication between the first resin chamber and the outer surface of the holding block, and a second passage providing fluid communication between the second resin chamber and the outer surface of the holding block;
   each coating die has a first end and a second end;
   each coating die is press fit into the channel in the holding block with its first end disposed toward the first end of the holding block; and
   the second end of each coating die which is adjacent to a resin chamber has a substantially planar end face and is substantially perpendicular to the channel axis.

2. A device for coating optical fibers as claimed in claim 1, characterized in that each coating die has a funnel-shaped passage connecting its first and second ends, the funnel-shaped passage having a wide opening at the first end and narrowing to a smaller opening at the second end.

3. A device as claimed in claim 2, characterized in that the device further comprises:
   first and second pressurized coating reservoirs;
   first means for providing fluid communication between the first reservoir and the first passage; and
   second means for providing fluid communication between the second reservoir and the second passage.

4. A device as claimed in claim 3, characterized in that the channel is circularly cylindrical.

5. A device as claimed in claim 4, characterized in that:
   the second reservoir is nearer to the second end of the holding block than the first reservoir; and
   the pressure in the second reservoir is greater than the pressure in the first reservoir.

6. A device as claimed in claim 5, characterized in that the funnel-shaped passages in the coating dies have axes, and the coating dies are arranged in the channel in the holding block with the axes of the passages lying on a straight line.

* * * * *